United States Patent [19]

Pascher

[11] Patent Number: 5,310,510
[45] Date of Patent: May 10, 1994

[54] METHOD FOR MANUFACTURING AN OPTICAL CABLE

[75] Inventor: Helmut Pascher, Munich, Fed. Rep. of Germany

[73] Assignee: Siemens Aktiengesellschaft, Munich, Fed. Rep. of Germany

[21] Appl. No.: 851,940

[22] Filed: Mar. 16, 1992

[30] Foreign Application Priority Data

Mar. 15, 1991 [DE] Fed. Rep. of Germany ....... 4108567
Mar. 15, 1991 [DE] Fed. Rep. of Germany ....... 4108569

[51] Int. Cl.⁵ .............................................. B29D 11/00
[52] U.S. Cl. ......................................... 264/1.5; 57/6; 385/105; 385/110
[58] Field of Search ................. 264/1.5; 385/103, 104, 385/105, 106, 110, 100; 57/6, 7, 8, 9

[56] References Cited

U.S. PATENT DOCUMENTS

| | | | |
|---|---|---|---|
| 4,904,321 | 2/1990 | Harvey | 264/1.5 |
| 4,935,170 | 6/1990 | Capol | 264/1.5 |
| 5,080,838 | 1/1992 | Broeckmann et al. | 264/1.5 |

FOREIGN PATENT DOCUMENTS 3839109 5/1990 Fed. Rep. of Germany.

Primary Examiner—James Lowe
Attorney, Agent, or Firm—Hill, Steadman & Simpson

[57] ABSTRACT

An optical cable has segment-like chamber elements with openings receiving a stack of waveguide bands characterized by the bands of each stack having a different length to compensate for stresses created by stranding the elements in an optical cable. To obtain the different lengths for each of the waveguide bands in a stack, the cable element is guided over a curved path, such as on a periphery of an insertion disc and the waveguide bands are then introduced into the chamber of the chamber element while in this curved position.

11 Claims, 4 Drawing Sheets

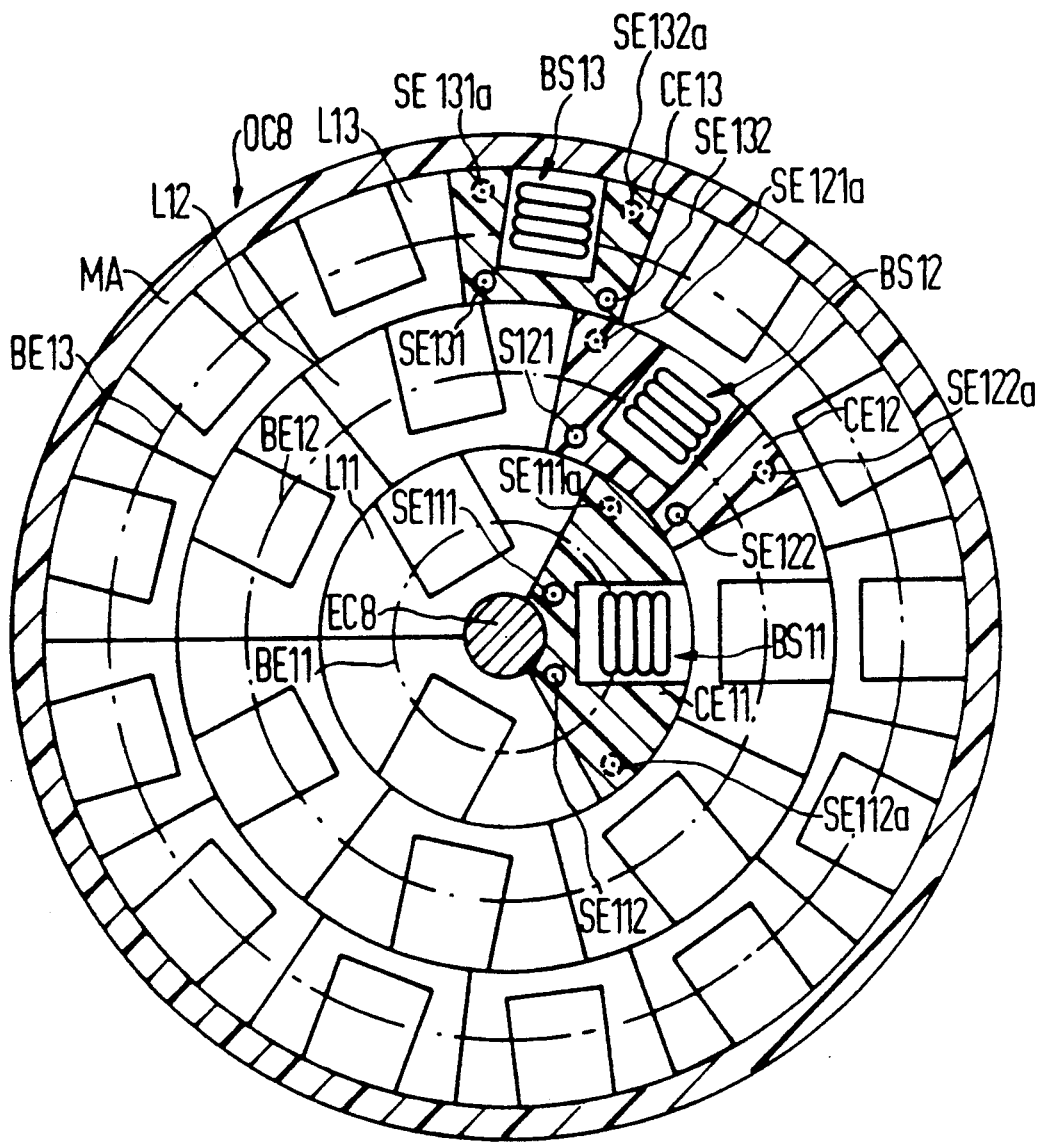

METHOD FOR MANUFACTURING AN OPTICAL CABLE

BACKGROUND OF THE INVENTION

The present invention is directed to a method for manufacturing an optical cable, whose cable core is composed of a plurality of chamber elements having openings at one side, which openings serve the purpose of accepting light waveguide bands or ribbons, to an apparatus for performing the method; and to an optical cable.

An optical cable, which has a plurality of chamber elements wrapped around a tension element with each of the chamber elements having radially outward openings for receiving optical elements, is disclosed in German Published Application 38 39 109. This design is often referred to as a "chambered cable", which receives light waveguides and has a shape of a cable core that is already constructed and has a cross sectional shape roughly like a spoked wheel. The cable is moved in a longitudinal direction and the light waveguides are then introduced into the chamber openings by a corresponding insertion device. Subsequently, a cover is wound or spun onto the device to close the openings and then a cable cladding is extruded in a final work step.

High packing densities can be achieved, given employment of light waveguide bands in the shape of ribbons, and such structures also have the advantage that they may be simply and rapidly spliced. The above-described manufacturing process, however, means that, by a contrast to what are referred to as "hollow leads", wherein the light waveguides are loosely accommodated in the inside of the protective sheath, work cannot be carried out with prefabricated sub-elements. On the contrary, the light waveguides can only be introduced into the cable core comprising the individual chambers on site.

SUMMARY OF THE INVENTION

An object of the present invention is to provide a way to insert the light waveguides into the chambers, on the one hand, and, also, to manufacture the entire cable core, on the other hand, which can be implemented in separate work steps in a simple way. According to the invention, this is accomplished by a method for manufacturing an optical cable, whose cable core is composed of a plurality of chamber elements which are opened on one side of the element and serve the purpose of accepting light waveguide bands. The improvement in the method is that each of the chamber elements are initially moved along a guided path, which has a curved portion, and that the light waveguide bands are placed as layers in the chamber element while the element is in the region of the path having the curved portion so that the light wave band lying further toward the outside of the curved path will have the greater length than the light waveguide lying further toward the inside of the curve, and that the cable core is composed of the chamber elements fabricated in such a way so that the chamber elements are arranged proceeding helically vis-a-vis the cable axis.

If the equipping of the chamber elements were implemented so that the chamber elements are initially guided and stretched on a straight line and the light waveguide bands or ribbons were then inserted into the open chambers, this would result wherein all light waveguide bands would have the same length. In the finished cable, however, the chamber elements are arranged helically around the cable axis, and this would result wherein the light waveguide bands lying on the floor of each of the chambers would be crushed or compressed, whereas the light waveguide bands lying on the outside toward the radial outermost position of the chamber opening would experience a stretching or tensioning. If there are high packing densities and relatively high stack heights, the light waveguide bands or ribbons can no longer be subjected to such stresses. The invention reduces, in a simple way, these stresses by the chamber elements being, first, respectively, guided in a path having a curved portion and inserting the light waveguide bands or ribbons as layers in each of the chambers while the curved chamber elements are on this curved path. As a result of the curved path of the chamber element during the insertion of the light waveguide bands, it is assured from the very outset that the bands lying on the chamber floor have a shorter overall length compared to the bands lying radially further outward. A structure for the bands is thereby guaranteed in this prefabrication so that during the manufacture of the chamber elements, they assume the corresponding position that they will have in the final, finished cable. An inadmissibly great crushing of the inwardly disposed bands or an inadmissibly great stretching of the outwardly disposed bands within the respective chambers is, thus, avoided.

Any curved path already has this property and yields an improvement in the mechanical stressing when the respective chamber element is guided on the curved path upon insertion of the light waveguide bands or ribbons.

According to an advantageous development of the invention, the curvature of the path can be selected so that the insertion process of the light waveguide bands or ribbons corresponds to the later curvature of the helically extending chamber element in the finished cable core to, thus, guarantee that the bands are subjected to absolutely no mechanical stressing, namely neither a crushing nor a stretching. Since the cable structure from which the respective chamber elements are provided is usually known, and the respective helical radius of the elements is also known, this matching of the insertion process on the one hand to the later manufacturing process for the cable cores can be implemented in a simple way.

When cables that are composed of a plurality of layers of individual chamber elements lying on top of one another are manufactured, it can be expedient to provide a greater curvature at the insertion path for the inner layer than for the chamber elements for the outer layer or for the outer layers. The manufacture can also occur so that the same average, smaller curvature is selected for a plurality of the layers disposed further toward the inside of the cable, and the same average, larger curvature is, likewise, selected for the plurality of layers of the chamber elements lying further toward the outside. The curvature is, thereby, respectively, matched to the average diameter of the respective layer in the finished cable.

The lengths of lay for each of the individual layers, however, are expediently selected differently so that approximately the same stranding curvature radius occurs for all. This is unproblemmatically possible for ranges of cable diameters and lengths of lay standard in cable technology.

The chamber elements manufactured according to the invention can be warehoused or stored, for example by being wound on drums, in a simple way. Thus, the process is expediently implemented with approximately the same curvature radius as the curvature during the insertion process. It is, thereby, assured that the light waveguides themselves, likewise, experience no inadmissible mechanical stresses in the region of the intermediate layering of the prefabricated chamber elements pre-equipped with light waveguide bands or ribbons. In addition to being wound on drums, of course, a deposit, for example on a plate having a corresponding curvature radius, is also possible as a way of storing the filled chamber elements.

The manufacture process having prefabricated chamber elements, into which the light waveguide bands or ribbons have already been inserted, is significantly simpler than the known prior art insofar as every such chamber element can be selectively supplied with the bands or ribbons, wherein the core itself is composed of a specific plurality of, for example, four, six or eight, such chamber elements in an approximately circular arrangement.

The accessibility of individual chamber elements, of course, is significantly more beneficial than, for instance, the accessibility of the cable core of a traditional type, which is already completely provided with chamber elements or with a spoke-like structure, wherein, due to the compact structure, the feed of the light waveguide bands or ribbons can lead to considerable difficulties because little space is available for the guide tubes and directing means that are required. In the invention, the insertion process for the light waveguide bands or ribbons need not occur in the region of the finished cable core, but chronologically and spatially outside this region, whereby more space is available for the insertion process.

The invention is also directed to an apparatus for the implementation of the method of the invention. The apparatus is characterized in that an insertion disc is provided and is used to guide at least one open chamber element in a circumferential direction at least in a sub-region, that supply reels are provided for the light waveguide bands or ribbons and that means are provided for inserting the bands or ribbons into a chamber element while it is in the region of the insertion disc.

The invention is also directed to an optical cable having a plurality of chamber elements, wherein the respective band stacks composed of a plurality of light waveguide bands are arranged, and wherein the camber elements proceed helically, as viewed in the direction of the longitudinal axis of the cable. The improvements in this optical cable are that the chamber elements each have, respectively, two reinforcing elements, which may be either tension and/or supporting elements which are allocated to them as longitudinal elements and that they are arranged proceeding outside of the neutral bending plane allocated in the cable core to the respective chamber element and are arranged on opposite sides of a radially extending plane of symmetry of the respective chamber element.

Other advantages and features of the invention will be readily apparent from the following description of the preferred embodiments, the drawings and claims.

BRIEF DESCRIPTION OF THE DRAWINGS

FIG. 8 is a transverse cross sectional view of an optical cable having a lift-off or floating band stacks in accordance with the present invention.

DESCRIPTION OF THE PREFERRED EMBODIMENTS

Figure 2:
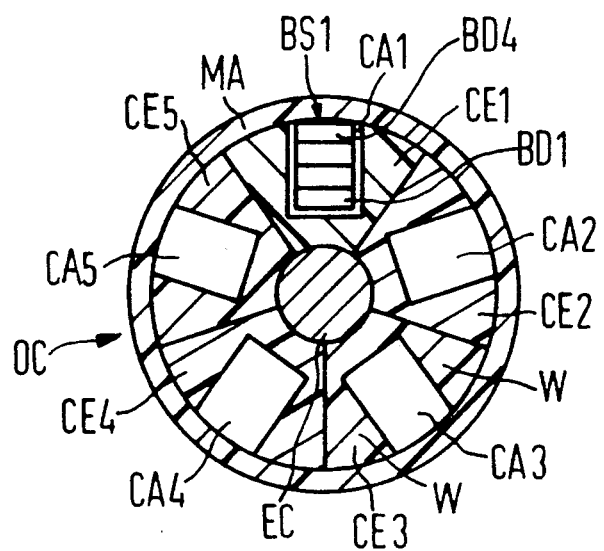
FIG. 2 is a transverse cross sectional view of an optical cable manufactured according to the present invention.

The principles of the present invention are particularly useful for forming an optical cable, generally indicated at OC in FIG. 2. The optical cable of FIG. 2 is composed of five chamber elements CE1-CE5 that are annularly arranged around a central tensile core EC. Each of the chamber elements is constructed so that they essentially abut one another and are mutually supported against one another, at least in sub-regions. On an outside, each of the chamber elements CE1-CE5 have chambers CA1-CA5, which, as illustrated, open radially outward. In the cable, the open chambers are closed by a spun covering or a wound covering (not shown here) and then a cable jacket MA is subsequently applied. This jacket MA may be composed of multi-layers and may also contain tensile elements.

Each of the chamber elements, such as CE1-CE5, has approximately a U-shaped structure, wherein the chamber opening is expediently rectangularly designed in order to introduce bands or ribbons BD1-BD4, each of which contains a fixed plurality of, for example, four or six light waveguides. These bands BD1-BD4 form a band stack BS. Overall, a band stack comparable to the band stack BS1 in chamber CA1 will lie in each of the chambers CA1-CA5.

Figure 1:
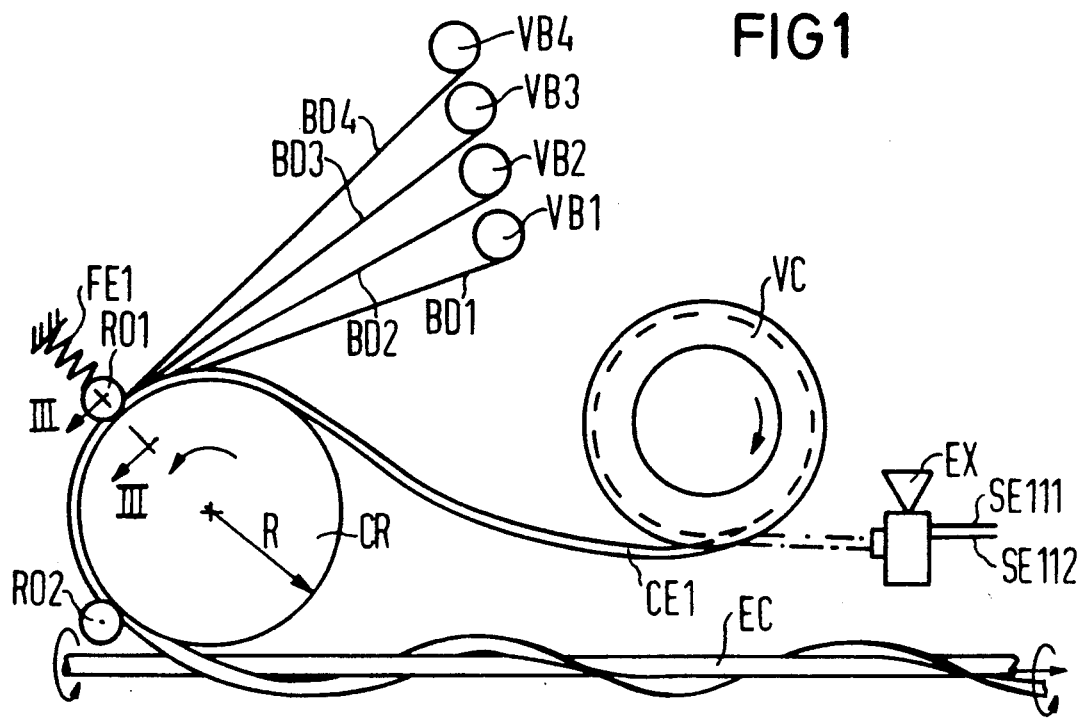
FIG. 1 is a diagrammatic view of an apparatus for implementing the method of the present invention, wherein the chamber elements are immediately subsequently wound on a cable core after the introduction of the waveguide bands.

According to the present invention, the cable OC is formed by a method and apparatus, such as illustrated in FIG. 1. A chamber element CE1 is provided on a supply reel VC, which, for example, has a winding diameter of between 600 mm and 750 mm. The chamber element CE1 is supplied to an insertion disc CR that has a radius R. The disc CR is rotated in the direction of the arrow with a defined rotational speed, which is provided by a motor (not illustrated). In at least a sub-region, the chamber element CE1 thereby places itself against the outside contour or surface of the insertion disc CR to move in a circular or curved path, and guide elements are provided to insure that the chamber element CE1 is positioned with its opening facing radially outward.

As illustrated in FIG. 1, four light waveguide bands BD2-BD4 are introduced into the chamber element CE1 from four supply reels VB1-VB4. The bands BD1-BD4 are taken from the supply reels VB1-VB4, which reels are supplied with brake devices and the bands are successively introduced into the chamber CA1 with the band BD1 lying adjacent the floor of the chamber CA1 and the bands BD2-BD4 being radially disposed relative to the floor. As a consequence of the curvature of the insertion disc CR, the bands BD1-BD4 are provided with different lengths, wherein the band BD4 will be longer because it lies at a greater radius that the band BD1. In order to assure a defined position or attitude, a pressure roller RO1 is provided and the roll RO1 will press elastically against the light waveguide bands, due to the biasing means formed by a compression spring FE1. This roller RO1 will hold the band stack BS1 together in conformity, as illustrated in FIG. 3, with the stack being on the floor of the chamber CA1 of the element CE1.

Figure 3:
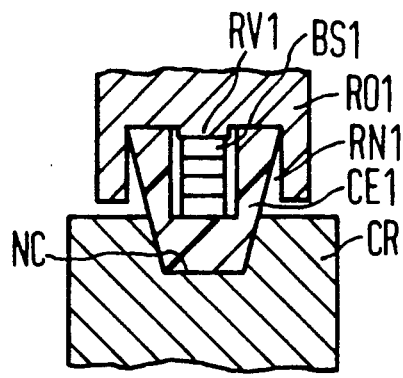
FIG. 3 is an enlarged cross sectional view taken along the lines III—III of FIG. 1.

The pressure roller RO1 is preferably constructed as illustrated in FIG. 3, wherein its outside peripheral region comprises a peripheral groove RN1, whose width is selected so that it provides lateral guidance for the chamber element CE1. The chamber element CE1, in turn, has its lower or narrower part introduced into a peripheral groove NC of the insertion disc CR that, likewise, contributes to a reliable guidance of the chamber element CE1. Of course, the groove NC can also be fashioned significantly deeper than indicated in FIG. 3 and it can also have its cross sectional shape matched to the cross sectional shape of the chamber element CE so that the side walls of the groove NC form a wedge-shaped cross section. An annular projection RV1 having a larger radius is provided in the central region of the base of the groove RN1. This projection extends into the chamber CA1 of the chamber element CE1 to such an extent that it will press directly on the blank stack BS1. The structure of a second roller RO2 of FIG. 1 can also have the same or similar shape of the roller RO1 of FIG. 3.

Referring back to FIG. 1, after departing the insertion disc CR2, the chamber element CE1 is stranded onto the core element EC of the optical cable OC, which is guided approximately tangentially to the insertion disc CR in a longitudinal direction and proceeds as closely thereto as possible. The insertion disc CR, thus, lies approximately close to and tangential to the running direction of the stranding means. The core element EC that is composed of the tensile material rotates around a longitudinal axis. By alternating the direction of rotation, it is also possible to produce SZ-stranding. The peripheral speed of the disc CR and the longitudinal drawing speed of the element EC, of course, must be matched to one another so that a largely tension-free application of the chamber element CE1 onto the core element is obtained.

The apparatus for charging or loading the other chamber elements CE2-CE5, according to FIG. 2, are constructed like that for the chamber element CE1 and, of course, lie spatially around the longitudinal axis of the production line. For example, they are arranged and distributed in a radial direction around the longitudinal axis of the core element EC.

It is also possible to directly manufacture each of the chamber elements CE1. This is shown by providing an extruder EX, for example, which will extrude the element CE1 which then can be taken directly to the insertion disc CR from the output of the extruder EC. Appropriate cooling devices would be provided along this path, and have not been shown for purposes of illustration.

Given the helically proceeding structure, which the chamber element CE1 assumes on the tensile core EC of FIG. 1, no mechanical stressing of the fibers is present in the light waveguide bands or ribbons. Taking the diameter of the core element EC into consideration, the length of lay with which the chamber element CE1 is applied onto the core element EC can be selected so that for this purpose there is no tensile stresses occurring due to the stranding process.

For a given cable wherein the dimensions of the central element EC are essentially present as a given quantity, thus, a structure for the light waveguide bands or ribbons in the union of the finished cable core can be achieved on the basis of the selection of a suitable diameter of the insertion disc CR. This structure either completely avoids the mechanical stressing of the light waveguides or, on the other hand, keeps the mechanical stressing so low that it remains within the prescribed tolerance range.

Figure 4:
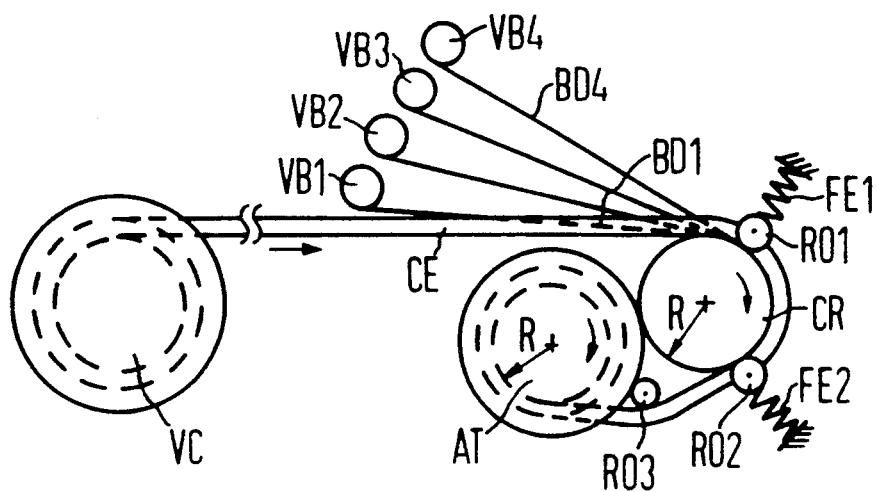
FIG. 4 is an embodiment of an apparatus for performing the method of the present invention.

An embodiment of the device of FIG. 1 is shown in FIG. 4 and shows a production line wherein the chamber element CE1 is, likewise, taken down from a supply reel VC and wherein the light waveguide bands BD1-BD4 are taken from supply reels VB1-VB4. This structure, thus, corresponds to the elements shown in FIG. 1. The pressure rollers RO1 and RO2 have essentially the same design and function as in the device of FIG. 1. The springs FE1 and FE2 act on these guide rollers RO1 and RO2. However, in this device, the equipment is arranged wherein the chamber element CE1 leaves the insertion disc CR and follows a different path. Namely, the element CE1 is guided by a roller, such as RO3, to a take-up drum AT, whose diameter R approximately corresponds to the diameter of the insertion disc and, namely, is provided as a storage arrangement for the element having the bands inserted therein. What is meant by the diameter R of the take-up drum AT is the average layer diameter, whereby the difference between the inner and outer layers of the wound-up chamber element CE1 exhibit no important differences between the inside and the outermost layer. As a final result, the chamber element CE1 lies on the take-up drum serving as a storage arrangement in a condition that is largely tension-free for the light waveguide bands BD1-BD4. Instead of using a take-up drum AT, a delivery plate, which is known in the art, can be utilized.

After departing the insertion disc CR, the chamber element CE1 is expediently guided by means including the guide roller RO3 up to the point where it is wound onto the drum AT in a path having the same direction as and, advantageously, approximately the same curvature as the insertion disc EC.

Figure 5:
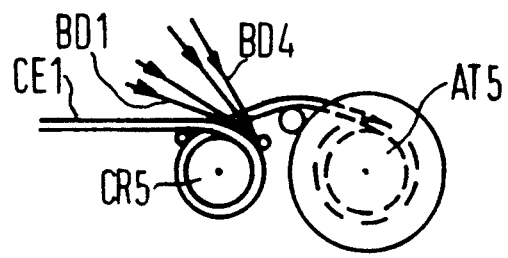
FIG. 5 is a modification of the apparatus of FIG. 4.

In a modification of this arrangement illustrated in FIG. 5, the insertion disc CR5 is nearly completely wrapped around by the chamber element CE1, which extends through a bend of greater 180° so that an optimally fixed, relative length coupling of the light waveguide bands to one another and to the chamber element CE1 occurs via the optimum wrap friction, which exponentially increases with the angle of wrap.

Figure 6:
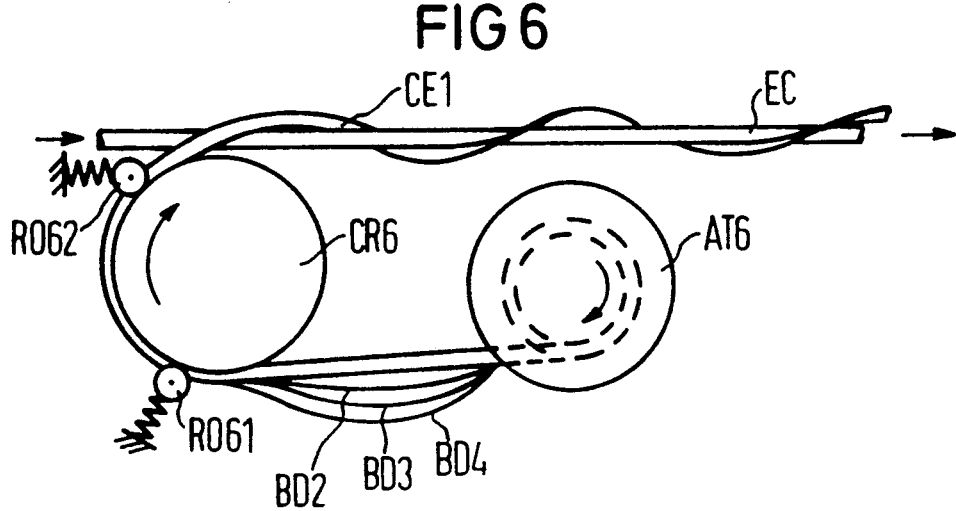
FIG. 6 is a stranding apparatus for stranding cable elements formed in accordance with the present invention.

How the completely equipped chamber element CE1 can be taken from the haul-off drum AT6 for the stranding process is shown in FIG. 6. It is hereby assumed that it is necessary for some operational reason or another to guide the chamber element CE1 on a straight line over a certain distance, namely until it strikes the laying or insertion disc CR6 in the present example, which serves the purpose of bringing the chamber element CE1 into a position in which the stranding onto the central element EC passing through from left to right can occur. Pressure rollers, such as RO61 and RO62, are provided for stabilization, and these have a job similar to that given to the arrangement in FIG. 1, namely to secure the position of the bands BD1-BD4 arranged in the chamber element CE1.

All bands of the stack can no longer be guided on a straight line because of the straight-line course of the sub-region between the haul-off drum AT6 and the laying disc CR6. The outermost band BD4 will, thus, be moved somewhat outward, which is shown greatly exaggerated in the drawings for purposes of illustration. In addition, the following band BD3, as well as the band BD2, to a certain extent, will be moved outward. In such a case, care must merely be exercised to see that the space is available into which the bands can move, for example an appropriate free space in the extension of an opening of the chamber element CE1.

If necessary, guide combs, dancing rollers or the like, for example, can also be provided to obtain exact positional stabilization of the bands in parts within the production equipment proceeding on a straight line. Each band has its own guide means matched to the geometry of the respective guidance allocated to it.

Figure 7:
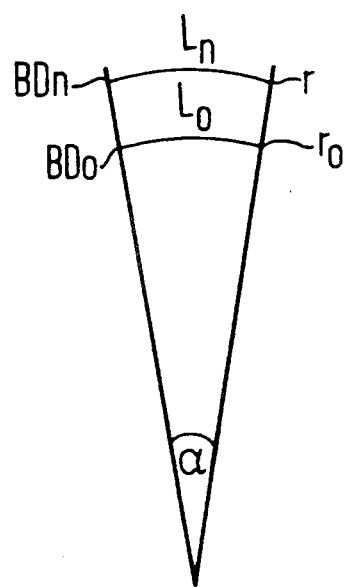
FIG. 7 is a schematic illustration for explaining the curvature relationship of the bands.

For explaining a geometric condition, FIG. 7 shows a portion of the curved path, whereby it is assumed that the bands BDo-BDn are arranged stack-like in a radial direction in a circular path proceeding over an angle $\alpha$. When the neutral position, as well as the length Lo, on the circular arc and the radius $r_o$ are allocated to the band BDo, whereas the outer path having the band BDn has a length of Ln and a radius r, with $$r = r_o + n \cdot \Delta r$$

and $r_o$ references the position for the neutral radius. The length allocated over an arbitrary angle $\alpha$ remains constant, i.e., their relationship as well, so that $$\frac{Ln}{Lo} = \frac{L'n}{L'o} \quad (1)$$

is valid. At the same time, a change of the radius $r_o$ into $r_o'$ occurs because of the modification of L into L'. According to the relationship $L = \alpha \cdot r$, this denotes the following relationship (given n layers of light waveguide bands, wherein each of these layers is to be assigned a thickness of $\Delta r$)

$$\frac{\alpha(r_o + n \cdot \Delta r)}{\alpha \cdot r_o} = \frac{\alpha(r_o' + n \cdot \Delta r')}{\alpha' \cdot r_o'} \quad (2)$$

After carrying out the division and simplification, $$\frac{\Delta r}{r_o} = \frac{\Delta r'}{r_o'} \text{ or transformed } \Delta r' = \Delta r \cdot \frac{r_o'}{r_o} \quad (3)$$

This means that the distance of each and every light waveguide band from the neutral bending line is proportional to the momentary curvature radius of the neutral bending line. It follows therefrom that the spacing of each and every light waveguide band from the neutral bending line of the chamber profile enlarges and that simultaneously, the spacing of the bands relative to one another also enlarges given an increase in the bending radius of the band stack, for example at the transition from the lying disc or when being unwound from the supply drum. Conversely, a decrease in the bending radius yields a closer adjacency of the bands and a lift-off or spacing of the band stack from the chamber floor. FIG. 8 shows an example of the band structure that will, thus, occur. The individual band stacks BS11, BS12 and BS13 are all lifted off or spaced from the floor so they no longer lie on the floor of the chamber opening and are packed more tightly together at the same time, and this has an advantageous influence on their common displaceability or longitudinal mobility. It is assumed in the example of FIG. 8 that the relationship between the curvature radius (i.e. the radius of the helix) that the respective chamber element assumes in the cable core to the radius r of the insertion disc CR lies approximately on the order of magnitude of 0.75.

An optical cable, generally indicated at OC8 in FIG. 8, has a cable core which is formed of three layers L11, L12 and L13 that radially follow one another from inside to outside. A tensile longitudinal element EC8 is provided in the center of the cable and is composed of, for example, steel or other tensile material, such as, for example, glass fibers, aramide fibers or the like. A plurality of chamber elements fashioned segment-like are provided in each of the layers L11-L13, wherein only one of these elements is respectively completely shown in each layer, and the remaining elements of each layer have only their outline indicated. Three chamber elements CE11 are provided in the inner layer L11, seven chamber elements CE12 are provided in the region of the middle layer L12, and thirteen chamber elements CE13 are provided in the region of the outer layer L13. Each of these chamber elements comprises an outwardly open, rectangularly fashioned chamber, whereby the space formed by the opened chamber is largely filled by a band stack BS11 for the chamber CE11, BS12 for the chamber CE12, and BS13 for the chamber CE13. Such a stack is composed of four light waveguide bands or ribbons, whereby such a band roughly has an approximately rectangular cross section and contains a plurality of light waveguides.

A neutral bending line or bending plane BE11-BE13, which are illustrated in dot-dash lines, are provided for each of the layers L11-L13. These bending planes BE11-BE13 proceed concentrically relative to the longitudinal axis of the optical cable OC8. The term "neutral bending plane" is, respectively, valid here only for the individual chamber elements during manufacture thereof or during the manufacture of the cable core, but does not apply to the cable OC8 as a whole.

A multi-layer cable jacket MA may be potentially provided on the outside of the cable OC8.

A pair of longitudinal reinforcing elements, which may be either tensile elements or crush-resistant elements, are allocated to every chamber element CE11-CE13. These reinforcing elements are referenced SE101 and SE102 for the chamber element CE11; SE121, SE122 for the chamber element CE12; and SE131 and SE132 for the chamber element CE13. By contrast to standard tensile or supporting elements that are referred to below as longitudinal elements for the sake of simplicity, the reinforcing elements of the present invention are not arranged in the region of the neutral bending plane BE11 and BE13, but outside this neutral bending plane. In the present example, all the longitudinal reinforcing elements SE111–SE132 lie further toward the radial inside than the bending planes BE11–BE13. Since the chamber elements CE11–CE13 are stranded onto a central element EC8 in layers with long lay, the arrangement of the longitudinal elements SE111–SE132, according to FIG. 8, result wherein the longitudinal elements each, respectively, comprise a slight length with reference, for example, to an arrangement in the region of the bending planes BE11–BE13. The longitudinal elements SE111–SE132 not only lie symmetrically equidistant from the respective neutral bending planes BE11–BE13, but they also are symmetrically arranged on opposite sides of the radial plane of symmetry for each of the elements CE11–CE13 and, preferably, equal distance from this radial plane of symmetry.

It is necessary that at least two such longitudinal elements are provided in every chamber element, for example one could, thus, also proceed so that the total of four such longitudinal elements are applied, instead of only two on both sides of the radial symmetry line of the chambers CE11–CE13, for example two to the right and two to the left of the radial plane of symmetry. The arrangement of at least two longitudinal elements symmetrically relative to the radial plane of symmetry has the advantage that a stabilized overall structure will occur and, for example, that a tilting or the like of the element will hardly occur. Since the longitudinal elements SE111–SE132 lie on the "inside track" in comparison to the respective neutral bending planes BE11, BE12 and BE13, they are compressed or crushed and they must be fashioned to be resistant in all instances, i.e., they must be supporting elements and must have a slightly rod-shaped structure. For example, they must be fashioned as steel wires, glass-fiber reinforced plastic elements, or the like.

The inner structure of the chamber elements CE21–CE23 can be modified in comparison to the illustrated structure insofar as the corresponding longitudinal reinforcing elements, as shown in broken lines by elements SE111a–SE132a, are not arranged inside, respectively, under the respective neutral bending planes BE11–BE13 for the chamber elements, but are disposed radially outside of the respective planes. This means that the length of the respective longitudinal reinforcing elements must be increased in comparison to an arrangement of the longitudinal elements SE111–SE132, which are in the region radially inward of the respective neutral plane. The longitudinal elements SE111a–SE132a must, thus, be tensile in all instances and be tensile elements.

One expediently proceeds in the manufacture that the longitudinal elements, such as SE111–SE132 or, respectively, SE111a–SE132a, are inserted at the extruder head EX, as illustrated in FIG. 1, while extruding each of the chamber elements to form the elements illustrated in FIG. 8.

It is also possible to provide recesses or grooves in the side walls of the chamber elements such side walls W of the element CE3 of FIG. 2. Reinforcing elements and/or electrical or optical transmission elements can be provided in these recesses.

Although various minor modifications may be suggested by those versed in the art, it should be understood that I wish to embody within the scope of the patent granted hereon all such modifications as reasonably and properly come within the scope of my contribution to the art.

I claim:

1. A method for manufacturing an optical cable composed of a plurality of chamber elements wrapped around a core, said chamber elements each having a chamber opened at one side of the element for receiving light waveguide bands, said method comprising the steps of providing said chamber elements, each element having a chamber opening on one side, guiding each chamber element in a path having a curved portion, inserting the light waveguide bands into the chamber of the element in the region of said curved path so that the light waveguide band lying furthest toward the outside of the curved path has a greater length than the light waveguide band lying toward the inside of the path, and then, subsequently, stranding the chamber element with like elements helically onto a cable core, which is moving along a cable axis.

2. A method according to claim 1, which includes, after the step of inserting the waveguide bands into the chamber of the chamber element and prior to stranding, depositing the chamber element in a storage arrangement as an intermediate product and retaining the different lengths of the waveguide bands.

3. A method according to claim 2, wherein the storage device has an average radius selected to be an approximately tension-free deposit of the light waveguide bands.

4. A method according to claim 1, wherein the step of providing the chamber element takes the chamber element from a supply reel and supplies it to an insertion means, which bends the element into said curved path.

5. A method according to claim 1, wherein the step of providing the chamber elements comprises extruding each chamber element and supplying the extruded element to means for bending the element into said curved path.

6. A method according to claim 1, wherein the step of guiding the chamber element on a curved path guides the element on a circular path.

7. A method according to claim 1, wherein the cable has a multi-layer of chamber elements, said step of guiding chamber elements on a curved path guides the chamber elements for an inner layer of the cable on a path having a greater curvature than the chamber elements for the outer layers.

8. A method according to claim 1, wherein a multi-layer cable is formed, and said step of stranding the chamber elements strands the chamber elements onto the cable core with correspondingly different stranding lengths of lay for the elements of the various layers.

9. A method according to claim 8, wherein the step of stranding the various layers of chamber elements strands the layers with different lengths of lay so that the stranding curvature radius derived for all layers is approximately the same.

10. A method according to claim 1, wherein the step of guiding each of the chamber elements guides each chamber element in a curved path with the opening directed toward the outside to enable insertion of the waveguide bands.

11. A method according to claim 1, wherein the step of providing chamber elements comprises manufacturing chamber elements having longitudinal reinforcing elements positioned outside of a neutral plane of the chamber element when stranded in the cable.

* * * * *